United States Patent [19]

Guma

[11] 4,432,581
[45] Feb. 21, 1984

[54] PORTABLE AUTOMATIC CARPORT

[76] Inventor: Tesfa Guma, 7709 Newcastle Dr., Annandale, Va. 22003

[21] Appl. No.: 336,582

[22] Filed: Jan. 4, 1982

[51] Int. Cl.³ .............................................. B60J 7/20
[52] U.S. Cl. ..................................... 296/136; 296/98; 135/88
[58] Field of Search ............... 296/136, 98; 160/11, 160/23; 135/88

[56] References Cited

U.S. PATENT DOCUMENTS

| | | | |
|---|---|---|---|
| 1,719,055 | 7/1929 | Herzer | 296/136 |
| 1,912,231 | 5/1933 | Wandscheer | 296/136 |
| 1,918,423 | 7/1933 | Persinger | 296/136 |
| 1,999,171 | 4/1935 | Bryant | 296/136 |
| 2,688,513 | 7/1954 | Poirier | 296/136 |
| 3,021,894 | 2/1962 | La Due | 296/136 |
| 3,222,102 | 12/1965 | Lucas | 296/136 |
| 3,563,594 | 2/1971 | London | 296/98 |
| 3,965,960 | 6/1976 | Massey | 160/11 |
| 3,992,053 | 11/1976 | Hrytzak et al. | 296/136 |
| 4,174,134 | 11/1979 | Mathis | 296/136 |

Primary Examiner—Robert R. Song
Attorney, Agent, or Firm—Cushman, Darby & Cushman

[57] ABSTRACT

A vehicle cover which automatically extends over the vehicle and retracts into a storage position. The cover has one end attached to a roller which is rotatably attached to the vehicle. A number of brackets are positioned along the upper surface of the vehicle. Guide elements are attached to the cover and slidably connected to the brackets. A plurality of tubes are attached to the covers, with some extending into flaps on the sides of the cover. When a compressor is actuated, the flaps extend outwardly to protect the sides of the vehicle. A scraper is provided to scrape snow or other extraneous matter as the cover is retracted.

27 Claims, 14 Drawing Figures

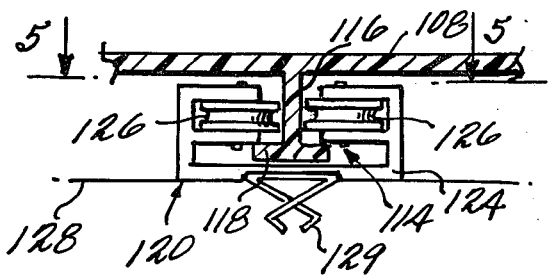
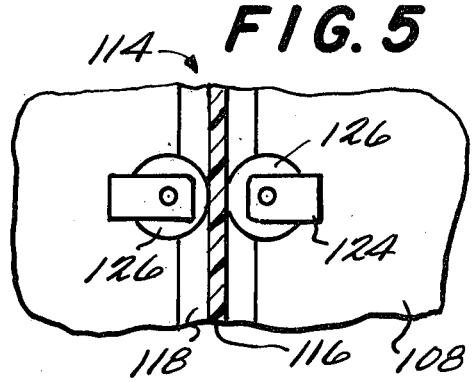
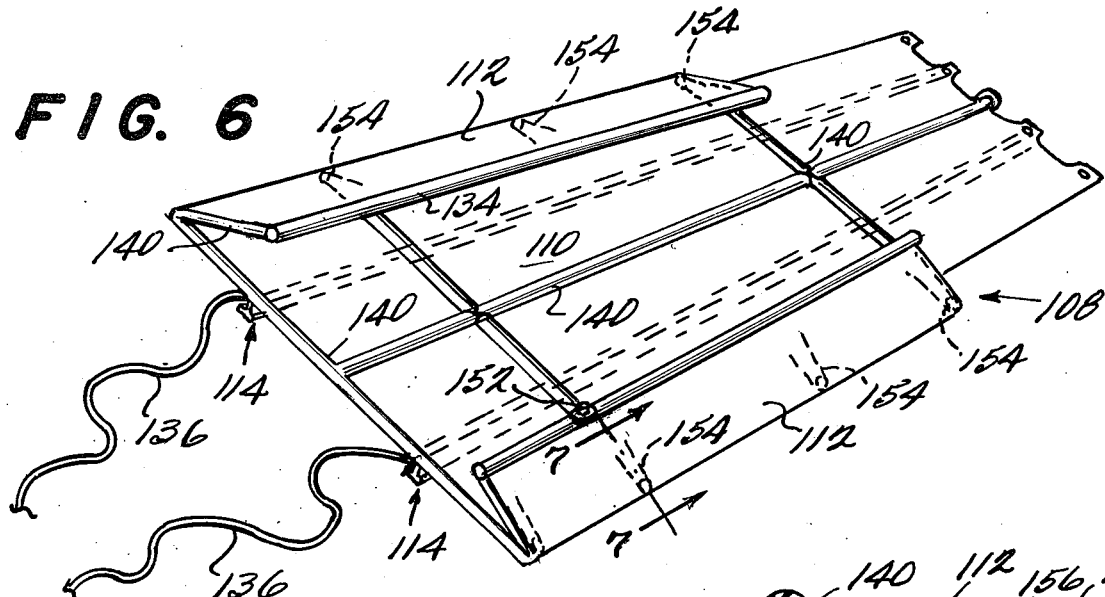
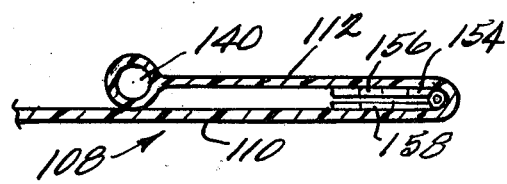
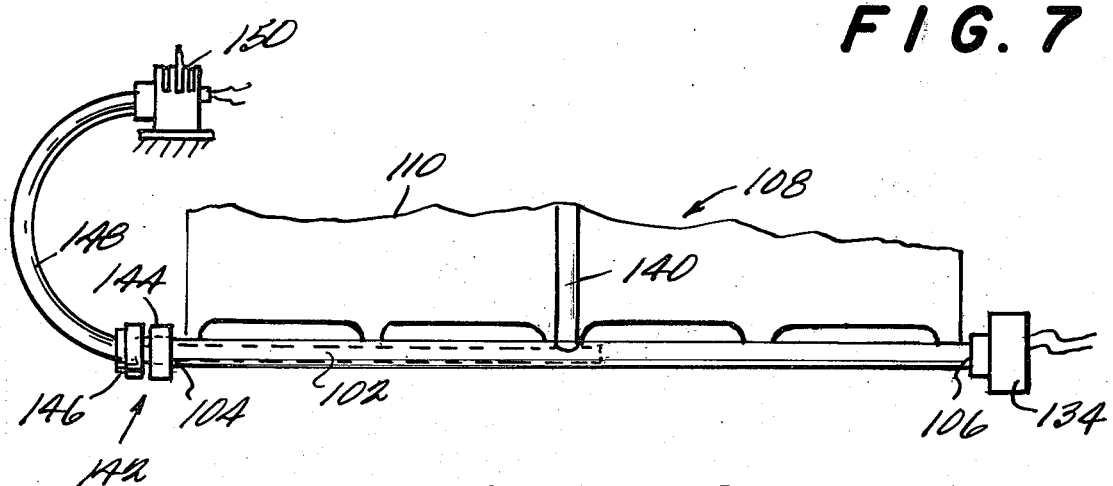

PORTABLE AUTOMATIC CARPORT

BACKGROUND OF THE INVENTION

1. Field of the Invention

The present invention relates to vehicle covers. More specifically, the present invention relates to those vehicle covers which can automatically be extended from a storage position to provide protection for the passenger compartment of a vehicle.

2. Description of the Prior Art

From the earliest days of vehicles with covered passenger compartments to the present, vehicle operators have contended with the elements. In summer, the sun beating down on a vehicle not only degrades the exterior finish of the vehicle, but also turns the passenger compartment into an oven. Rain, particularly mud rains, not only dirty the vehicle surface, but also permanently fade the finish. During the winter, snow and ice cake on the passenger compartment, particularly the windows, requiring the operator to brave the elements to scrape the windows so as to enhance driving safety. Hail may actually dent the vehicle surface or damage the finish.

To overcome these problems, car covers have long been known consisting of fabric or plastic shaped to the form of the particular vehicle. This cover may be stored in the trunk of the vehicle in a folded state, and then taken out and spread over the vehicle to provide protection. Although such a cover does protect the vehicle from the elements, a number of drawbacks exist. First, the cover must be manually placed on the vehicle, manually removed and manually folded. Not only is this procedure time consuming, but also difficult for one person to manage, particularly with larger vehicles. Furthermore, in winter, after a snowfall, it is necessary to clear the cover of ice and snow before it can be properly folded and stored.

To overcome these problems, automatically extending and retracting vehicle covers have been developed. Thus, U.S. Pat. No. 4,174,134 to Mathis teaches a cover which is stored on a roller. The leading edge of the cover is attached to conveyor lines. When a motor is operated, the roller turns and the lines move so as to draw the cover over the passenger compartment of the vehicle.

Several problems exist with the cover assembly disclosed in Mathis. First, the conveyor lines are directed simply by rollers. Thus, a tendency may exist for the conveyor lines to jump off of the rollers, particularly in winter when ice and snow may interfere with smooth operation. Also, although the Mathis cover might protect the upper surfaces of the vehicle, rarely does the sun shine from directly overhead and rarely does snow fall absolutely vertically, unaffected by wind. The Mathis cover provides no protection for the sides of the vehicle. Finally, if snow should fall while the cover is extended, it would be necessary to scrape the cover so that the ice and snow is not rolled in with the cover.

U.S. Pat. No. 2,688,513 to Poirier teaches a power operated vehicle cover that solves some of the problems of the Mathis cover, yet creates additional problems. Thus, Poirier teaches the use of flaps to protect the sides of a vehicle. However, the flaps must be positioned manually, thus introducing some of the inconvenience inherent with fully manual covers. Also, although the cover extends automatically from a roll in the rear of the vehicle, it appears that no guides are employed to insure that the cover proceeds properly from the roller. Finally, as with Mathis, if snow should fall while the cover is extended, it would be necessary to scrape the cover prior to retraction to ensure that snow is not rolled with the cover upon retraction.

A number of other U.S. Patents, in addition to the two discussed above also describe vehicle covers. See U.S. Pat. Nos. 3,992,053, 3,222,102, 3,021,894, 1,999,171, 1,918,423, 1,912,231, 1,719,055.

SUMMARY OF THE INVENTION

The present invention overcomes the problems identified above by providing a vehicle cover which automatically extends over the vehicle and retracts into a storage position. Furthermore, the cover includes flaps which automatically extend outwardly to the sides of the vehicle to provide protection for the sides.

In the present invention, a roller is rotatably attached to the vehicle. The cover has one and attached to the roller. A number of brackets are positioned along the upper surface of the vehicle. Guide elements are attached to the cover and slidably connect to the brackets.

A motor is attached to the roller for wrapping the cover about the roller. Likewise, a motor is placed at the opposite end of the vehicle for extending the cover. In this regard, lines are attached to the front end of the cover in alignment with the guides for connecting the cover to the motor. The lines, like the guides, pass through the brackets.

A plurality of tubes are attached to the covers, with some extending into the flaps. A compressor is provided for filling the tubes with air. When the compressor is actuated, the flaps extend outwardly to protect the sides of the vehicle. When pressure in the tubes is released, the flaps fold back over the main portion of the cover by means of springs.

The roller is placed in a compartment in which the cover is stored while not in use. A scraper is provided at the entrance of the compartment so as to scrape snow or other extraneous matter as the cover is retracted. Thus, it is not necessary for extraneous matter to be manually removed from the cover before it is retracted.

This arrangement produces a number of advantages in addition to those discussed above. The cover protects the vehicle from direct exposure to the sun's rays. As a result, the cover reduces the uncomfortably hot temperature to which a vehicle interior typically rises during the summer. In the same regard, energy is conserved by reducing the need for air conditioning. Both the interior and exterior of the vehicle can be protected from the damaging effects of the sun, such as scorching, fading, discoloration and wear, resulting in lower maintenance costs and longer life. The finish is protected from rain and mud rain. In addition to reducing color fading, it also reduces the time, human energy and money normally spent on washing and polishing.

In winter, the cover protects the exterior of the vehicle from snow and hail, reducing the cost of vehicle body maintenance. Also, the cover eliminates the necessity of scraping snow and frost from the vehicle windows. The scraper feature of the present invention eliminates the necessity of having to remove snow from the cover prior to retraction.

Thus, with the present invention, a vehicle may be covered and uncovered effortlessly, with a push of a button. The use of the cover reduces the necessity of spending extra money for parking vehicles in covered lots. Similarly, the cover reduces the need for vehicle garages or ports. Thus, the present invention enables houses to be built economically without garages, enabling the space intended for the garage to be employed to greater advantage. In other words, vehicles will be carrying their own carports for use anywhere.

BRIEF DESCRIPTION OF THE DRAWING

These and other objects and advantages of the present invention will become more apparent and more readily appreciated from the following detailed description of the presently preferred exemplary embodiment of the invention taken in conjunction with the accompanying drawing, of which:

FIG. 4 is a side elevational view of the bracket of the present invention with the cover in section;

FIG. 5 is a sectional view of the present invention taken along the 5—5 line of FIG. 4;

FIG. 6 is a perspective view of the cover of the present invention;

FIG. 7 is a sectional view taken long the 7—7 line of FIG. 6;

FIG. 8 is an exploded, partially schematic view of the roller of the present invention;

DETAILED DESCRIPTION OF THE PRESENTLY PREFERRED EMBODIMENT

Figure 1:
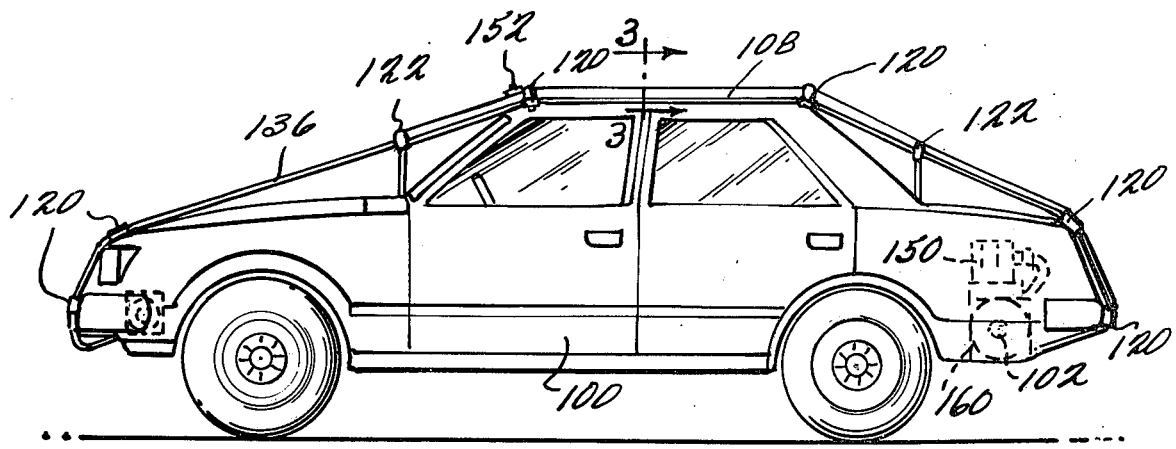
FIG. 1 is a side elevational view of the presently preferred exemplary embodiment of this invention mounted on a vehicle.
Figure 2:
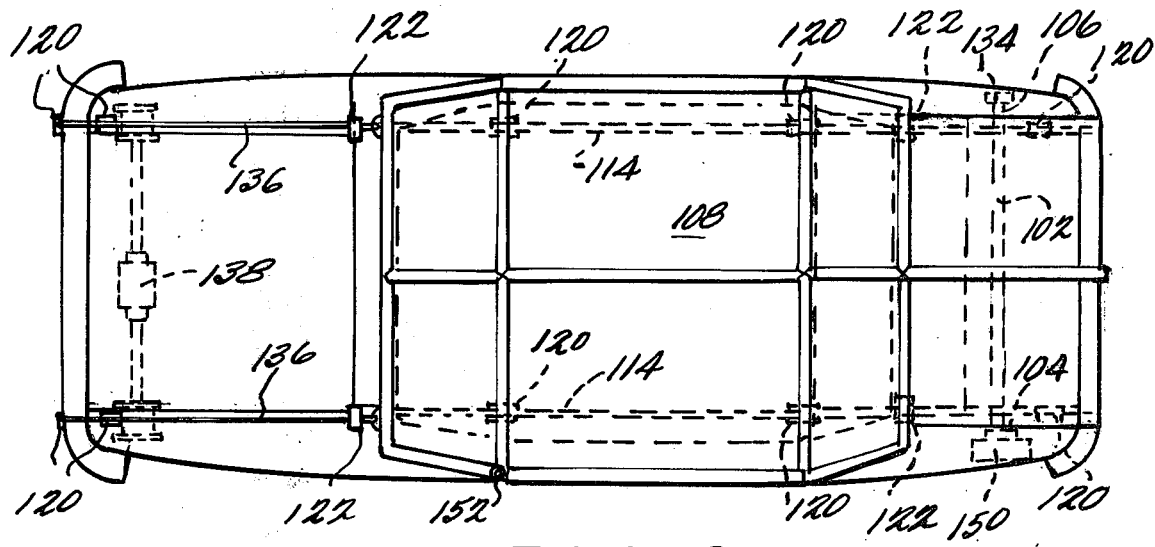
FIG. 2 is a top plan view of the present invention.
Figure 3:
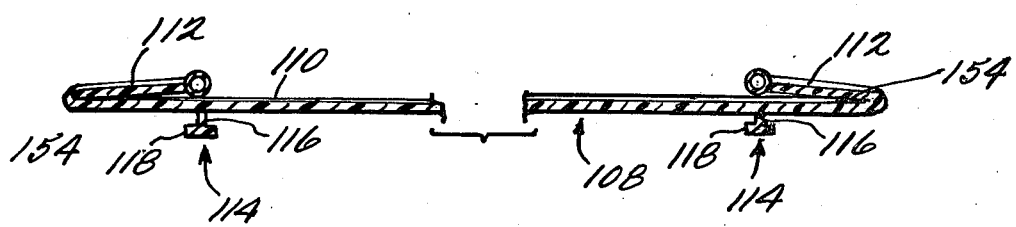
FIG. 3 is a sectional view taken along the 3—3 line of FIG. 1.
Figure 9:
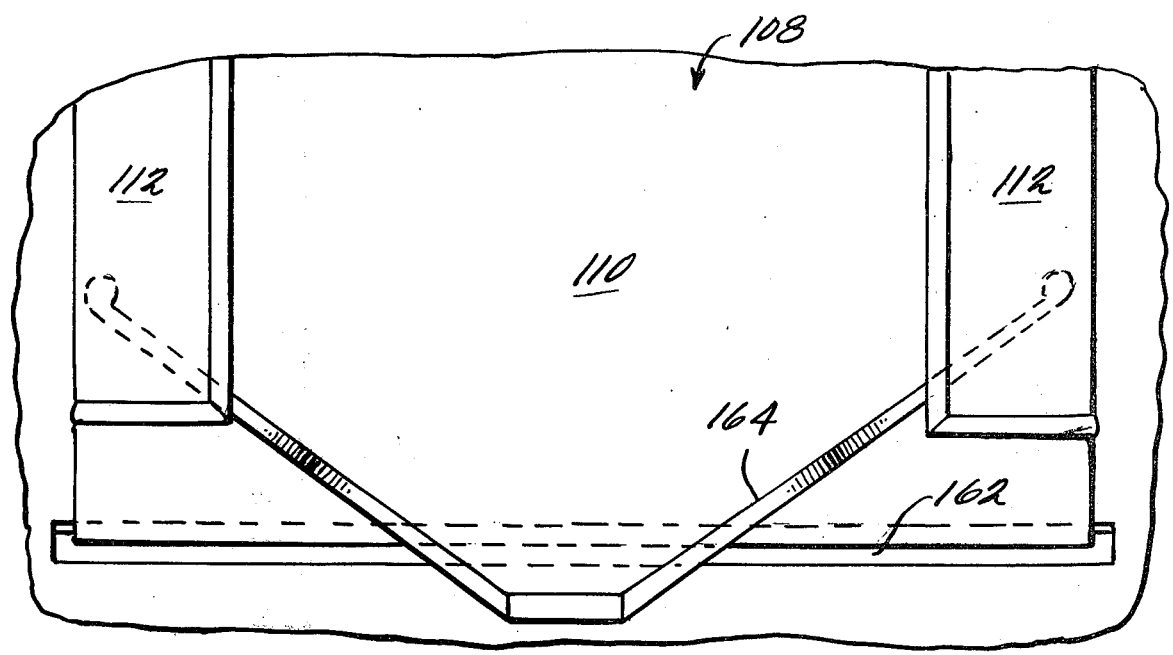
FIG. 9 is a rear, fragmentary, elevational view of the present invention illustrating the scraper.
Figure 10:
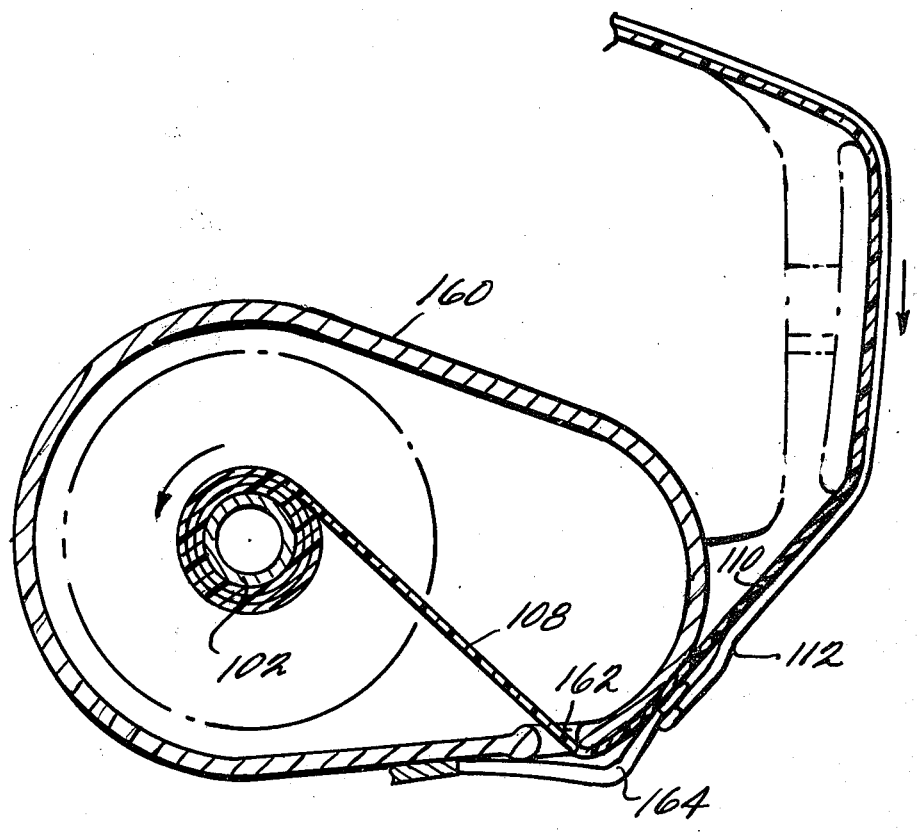
FIG. 10 is a fragmentary longitudinal sectional view through the roller container of the present invention.

As illustrated in FIGS. 1, 2 and 10, rotatably attached to vehicle 100 is roller 102. Roller 102 is hollow, having an open end 104 and a closed end 106. As illustrated in FIG. 8, cover 108 is attached to roller 102 and may, for example, be made of vinyl. As best illustrated in FIGS. 3 and 6, cover 108 includes a main portion 110, and flaps 112. In fact, one end of main portion 110 is connected to roller 102, and flaps 112 are at the sides of main portion 110.

As best illustrated in FIGS. 3, 4, 6 and 8, first and second guide means 114 are attached to the underside of cover 108. In the preferred embodiment, each of guide means 114 includes a first portion 116 extending vertically from and attached to cover 108 and a second portion 118 extending outwardly from portion 116 so as to form a "T" with portion 116. Guide means 114 must be sufficiently flexible to allow cover 108 to bend, and in the preferred embodiment are plastic.

Figure 11:
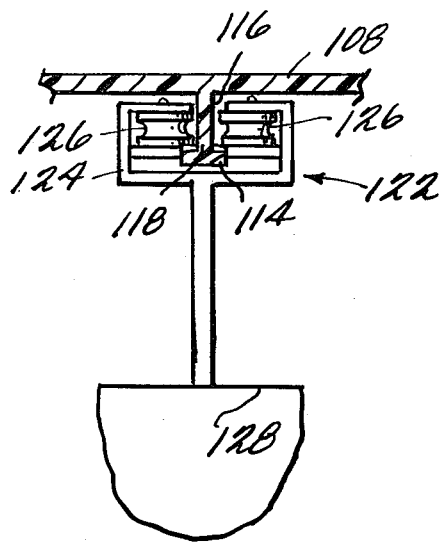
FIG. 11 is a fragmentary exploded view of the retractable bracket feature of the present invention, partially in section.

As illustrated in FIGS. 1, 2, 4, 5 and 11, guide means 114 are designed to engage with fixed brackets 120 and retractable brackets 122. As best illustrated in FIGS. 4, 5 and 11, each of brackets 120 and 122 includes a housing 124 which contains wheels 126 which rotate about axes normal to the surface of the vehicle. The gap between wheels 126 is sufficiently large to allow portion 116 of guiding means 114 to pass therebetween, yet portion 118 cannot pass through the gap. In this manner, guiding means 114, and thus cover 108 are slidably attached to brackets 120 and 122.

Figure 12:
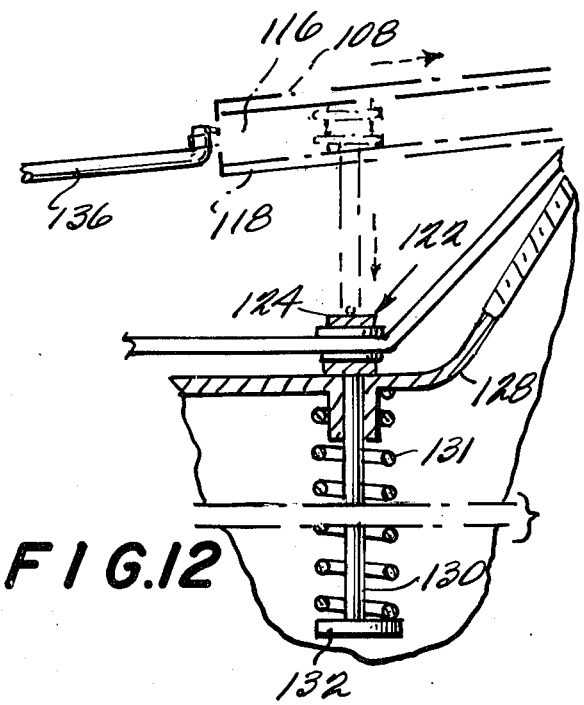
FIG. 12 is a sectional view of the retractable bracket feature of the present invention.

As best illustrated by comparing FIG. 4 with FIGS. 11 and 12, each fixed bracket 120 differs from each retractable bracket 122 in that each fixed bracket 120 is attached to surface 128 of vehicle 100 by means of clip 129. On the contrary, housing 124 of retractable bracket 122 can move away from surface 128. Thus, as illustrated in FIG. 12, retractable bracket 122 includes compression spring 131 having an upper end which butts against surface 128 of vehicle 100. Housing 124 is attached to shaft 130 which extends downwardly through spring 131. At the end of shaft 130 is stop 132 which butts against the lower end of spring 124. In this manner, housing 124 is biased downwardly toward surface 128. In fact, brackets 122 can be disposed in the grooves around the luggage compartment and hood so that they disappear completely when brackets 122 are retracted. Nevertheless, if sufficient force is applied, housing 124 can be pulled away from the surface 128.

As illustrated in FIGS. 2 and 8 driving means 134 is attached to closed end 106 of roller 102, and can be actuated to retract cover 108. In the preferred embodiment, drive means 134 is an electric motor, although a pneumatic motor or any other type of motor could be employed. To extend cover 108, lines 136 are provided which are attached to an end of cover 108 in alignment with guide means 114. Lines 136 have a diameter sufficiently large so that they cannot pass between wheels 126 of brackets 120 and 122. In fact, lines 136 may have the same cross sectional form as guide means 114. Thus, lines 136 are also slidably connected to brackets 120 and 122.

The opposite ends of lines 136 are connected to drawing means 138. In the preferred embodiment, drawing means 138 is approximately centrally disposed between the sides of vehicle 100, with shafts extending from each end thereof to pulleys on which lines 136 are wound. Obviously, instead, lines 136 may be directed by pulleys or bowden wires to drawing means 138 at which they are wound on a wheel attached to the motor shaft. In the preferred embodiment, drawing means 138 is an electric motor. However, it is obvious that drawing means 138 can also be a pneumatic motor or any other device for applying a force to lines 136.

For example, it is possible to replace electric motor 138 with spring loaded reels. Thus, lines 136 would be wound about the spring loaded reels. The springs would be sufficiently strong to pull cover 108 to an extended position, and motor 134 would be employed to retract cover 108. Obviously, this situation can be reversed so that roller 102 is rotated by means of a spring loaded device to retract cover 108 and motor 138 is employed to extend cover 108. A locking device is employed to present the spring loaded device from extending cover 108 when it is in a stored position.

Also, both motor 134 and motor 138 may be disposed at the rear of the vehicle. In this case, simple pulleys would be placed at the front of the vehicle so as to route lines 136 back toward the rear of the vehicle. Brackets 120 and 122 would have to be double brackets so as to be able to control the positioning of line 136 as it returns to motor 138 at the back of the vehicle.

Motor 138 and associated hardware may be placed anywhere at the front of the vehicle. In the preferred embodiment, it is placed behind the front bumper. Alternately, it may be placed on top of the front bumper. Placement depends upon the design of the particular vehicle in which the system is to be installed.

Attached to cover 108 are inflatable tubes which interconnect to form containing means 140. As ca be seen in FIG. 6, one tube of containing means 140 extends along the longitudinal axis of cover 108. Two tubes run transversely to this longitudinal tube, extending into flaps 112. Tubes are also provided along the edges of flaps 112.

As illustrated in FIG. 8, containing means 140 is connected to roller 102 so that the interior of containing means 140 can communicate with the interior of roller 102. Rotatable coupling 142 has a first portion 144 attached to end 104 of roller 102. A second portion 146 of rotatable coupling 142 is attached to hose 148. Portions 144 and 146 are able to rotate with respect to each other, yet maintain an airtight seal. Hose 148 is connected to air compressor 150. When compressor 150 is energized, air is pumped into containing means 140 so as to inflate it. This causes flaps 112 to expand outwardly towards the sides of vehicle 100. Thus, more of vehicle 100 is protected against the elements. When compressor 150 is deenergized, air is maintained in tubing 140.

When compressor 150 is deactuated and valve 152 is opened, tubing 140 will deflate. As this occurs, torsion springs 154 will cause flaps 112 to fold over main portion 110. That is, as illustrated in FIG. 7, torsion springs 154 have a first arm 156 attached to flaps 112 and the second arm 158 attached to main portion 110. In a relaxed state, arms 156 and 158 are proximate each other. However, when a force is applied, arms 156 and 158 can be separated. Springs 154 must be sufficiently strong to enable flaps 112 to fold over main portion 110 when air is released from tubing 140. However, the force applied by torsion springs 154 cannot be so strong as to prevent webbing 140 from expanding flaps 112 when tubing 140 is pressurized with air.

As indicated during the preferred embodiment, containing means 140 is actually formed of tubes attached to cover 108. The transverse tubes are slightly bowed so that cover 108 does not touch the top of vehicle 100. This provides an air space between cover 108 and the top of vehicle 100 to enhance the cooling effect of the cover during the summer and to provide a buffer for the vehicle surface with respect to extraneous matter.

Instead, cover 108 may be formed of a double layer of material cemented together. Containing means 140 may be formed by portions of cover 108 wherein the two layers are not cemented together, thus forming channels through which air can flow.

As best illustrated in FIG. 10, roller 102 and motor 134 are disposed in, and cover 108 is stored in, compartment 160. As illustrated in FIGS. 1 and 10, compartment 160 is disposed behind and slightly below the rear bumper of vehicle 100. Cover 108 passes out of container 160 through slit 162 to cover the vehicle.

When cover 108 is extended over vehicle 100, snow, leaves and other extraneous material will collect on cover 108. When flaps 112 are folded over main portion 110, this material will be trapped under flaps 112. Scraper 164 is provided to eliminate the extraneous material on top of cover 108. As illustrated in FIG. 10, scraper 164 is attached to container 160 on the side of slit 162 which the top surface of cover 108 faces. Scraper 164 extends across slit 162 so as to engage cover 108. In fact, scraper 164 extends under flaps 112 so as to remove extraneous material stuck thereunder.

Figure 13:
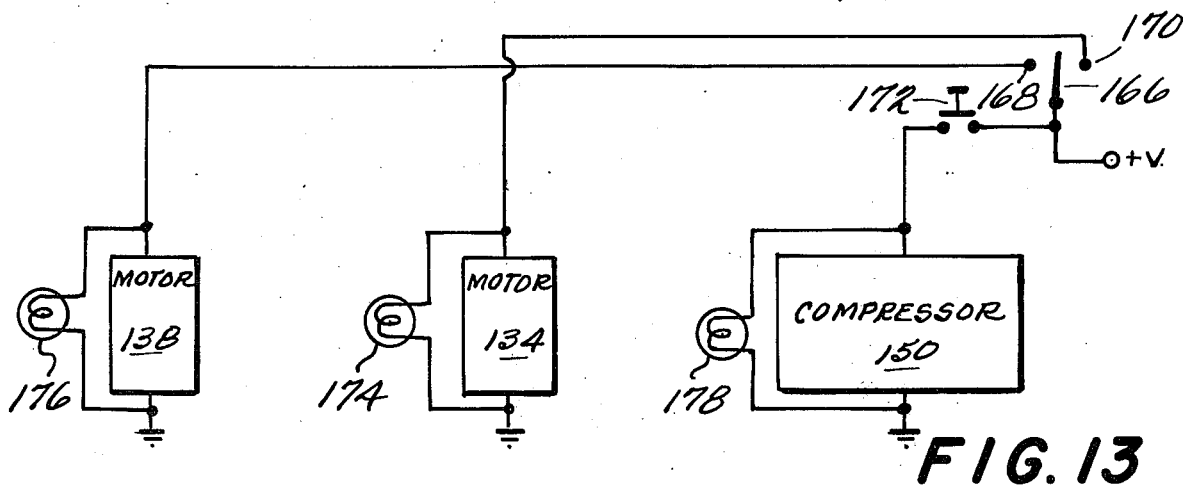
FIG. 13 is a circuit diagram of the present invention.
Figure 14:
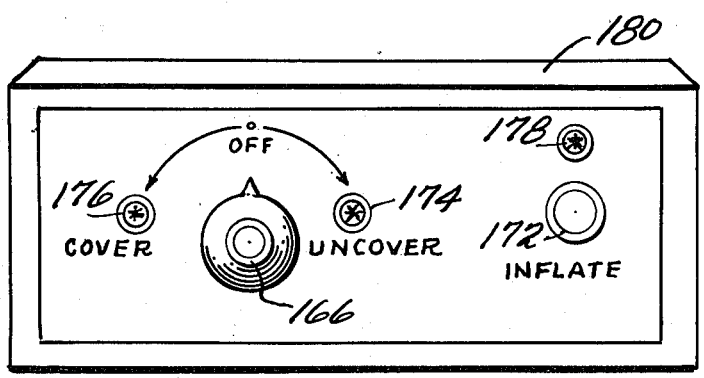
FIG. 14 is a schematic illustration of the operator control panel of the present invention.

FIG. 13 illustrates a circuit diagram of the present invention and FIG. 14 illustrates a panel for controlling the present invention. Thus, motors 134 and 138 are connected to the battery through switch 166. Switch 166 is spring biased to a neutral position between contacts 168 and 170. To energize either motor 134 or 138, switch 166 must be held so that the movable member contacts either contact 168 or 170. Pushbutton switch 172 connects compressor 150 to the battery. Pushbutton switch 172 is spring biased to an open position, and must be manually actuated to maintain the circuit closed. Indicator lamps 174, 176 and 178 respectively, indicate that motor 134, motor 138 and compressor 150 have been energized.

As illustrated in FIG. 14, switches 166 and 172 and indicator lamps 174, 176 and 178 may be disposed in housing 180.

To cover the vehicle, switch 166 is manually operated to the cover position to energize motor 138. This causes motor 138 to pull lines 136, which in turn pull cover 108 from container 160. Brackets 120 and 122 guide lines 136 and cover 108 to the proper position. Once cover 108 has advanced to the appropriate position, switch 166 is released, deenergizing motor 138. Then, switch 172 is operated to energize compressor 150. This causes tubing 140 to inflate, extending flaps 112 outwardly. As a result of the rigidity of tubing 140 when it is inflated, retractable brackets 122 are pulled away from the surface of the vehicle as illustrated in phantom line in FIG. 12.

To store the cover, valve 152 is opened to deflate tubing 140. After deflation has proceeded sufficiently far to cause torsion springs 154 to retract flaps 112 over main portion 110, switch 166 may be manually operated to the uncover position so as to energize motor 134. This causes roller 102 to rotate, wrapping cover 108 about it. As cover 108 retracts, scraper 164 eliminates extraneous matter that may have collected on the top of cover 108. Once cover 108 is fully retracted, switch 166 is released so as to deenergize motor 134. At this time, springs 124 of retractable brackets 122 are sufficiently strong to retract adjacent to the surface of vehicle 100. As a result, lines 136 are pulled closely to the surface of vehicle 100, thus helping to preserve the normal features of the car and presenting a more flowing profile for normal driving.

Although only a few exemplary embodiments of this invention have been described in detail above, those skilled in the art would readily appreciate that many modifications are possible in the exemplary embodiments without materially departing from the novel teachings and advantages of this invention. Accordingly, all such modifications are intended to be included within the scope of this application as defined in the following claims.

What is claimed is:

1. A cover for a vehicle, said vehicle having a passenger compartment, said cover comprising:
cover means attached to said vehicle;
a plurality of brackets attached to the upper surface of said vehicle;
means, attached along substantially the entire length of said cover means, for guiding said cover means over said brackets, said guiding means including a first portion attached to said cover means and extending through at least a part of each of said brackets and a second portion, attached to said first portion opposite said cover means attachment, which cannot pass through said at least a part of each of said brackets to slidably lock said guide means to said brackets; and means for extending and retracting said cover means, said cover means for covering the length of said passenger compartment when said cover means is fully extended.

2. An expandable cover for a vehicle, said vehicle having a passenger compartment, said cover comprising:
   cover means attachable to said vehicle;
   means for extending and retracting said cover means, said cover means for covering the length of said passenger compartment when said cover means is fully extended;
   said cover means including flaps on opposite sides of said cover means and extending along said passenger compartment when said cover means is extended; and
   means for extending said flaps substantially horizontally outwardly from said cover means, and folding said flaps over said cover means in a retracted position.

3. An expandable cover for a vehicle, said vehicle having a passenger compartment, said cover comprising:
   cover means attachable to said vehicle;
   means for extending and retracting said cover means, said cover means for covering the length of said passenger compartment when said cover means is fully extended;
   said cover means including flaps on opposite sides of said cover means and extending along said passenger compartment when said cover means is extended;
   means for extending said flaps substantially horizontally outwardly from said cover means, and folding said flaps over said cover means in a retracted position; and
   means for scraping said cover means as said cover means is retracted so as to eliminate foreign material on said cover means, said scraping means being disposed under said flaps and above the remainder of said cover means.

4. An expandable cover for a vehicle, said vehicle having a passenger compartment, said cover comprising:
   cover means attachable to said vehicle;
   means for extending and retracting said cover means, said cover means for covering the length of said passenger compartment when said cover means is fully extended;
   said cover means including flaps on opposite sides of said cover means and extending along said passenger compartment when said cover means is extended; and
   pneumatic means for extending said flaps outwardly from said cover means.

5. A cover as in claim 2 or 4 further comprising:
   a plurality of brackets attachable to the upper surface of said vehicle; and
   means, attached along the length of said cover means, for guiding said cover means over said brackets, said guiding means being slidably engageable with said brackets.

6. An expandable cover for a vehicle, said vehicle having a passenger compartment, said cover comprising:
   cover means attachable to said vehicle;
   means for extending and retracting said cover means, said cover means for covering the length of said passenger compartment when said cover means is fully extended;
   said cover means including flaps on opposite sides of said cover means and extending along said passenger compartment when said cover means is extended;
   means, attached to said cover means, for containing a fluid, said containing means being disposed into said flaps so as to extend said flaps outwardly from said cover means when said containing means is filled with said fluid; and
   means for filling said containing means with said fluid.

7. A cover as in claim 6 wherein:
   said cover further comprises a rotatable roller attachable to said vehicle, said cover means being attached to said roller, said roller being hollow having a closed end and an open end, said containing means being attached to said roller so as to communicate with the interior of said roller; and
   said filling means comprises a compressor and a rotatable coupling having a first portion fixed with respect to said roller and a second portion fixed with respect to said compressor.

8. An expandable cover for a vehicle, said vehicle having a passenger compartment, said vehicle comprising:
   cover means attachable to said vehicle;
   means for extending and retracting said cover means, said cover means for covering the length of said passenger compartment when said cover means is fully extended;
   said cover means including flaps on opposite sides of said cover means and extending along said passenger compartment when said cover means is extended;
   means, attached to said cover means, for containing a fluid, said containing means being disposed into said flaps so as to extend said flaps outwardly from said cover means when said containing means is filled with said fluid;
   means for filling said containing means with said fluid; and
   means for retracting said flaps when said fluid is released from said containing means.

9. A cover as in claim 2, 3, 4 or 8 wherein said cover means extending and retracting means comprises:
   a roller rotatably attached to said vehicle on one side of said passenger compartment, a first end of said cover means being attached to said roller;
   means for driving said roller so as to wrap said cover means about said roller;
   means for drawing said cover over said passenger compartment; and
   means, attached to a second end of said cover for connecting said cover to said drawing means.

10. A cover as in claim 9 further comprising:
    a plurality of brackets attached to the upper surface of said vehicle;

means, attaching along the length of said cover means, for guiding said cover means over said brackets, said guiding means being slidably engageable with said brackets; and at least one of said brackets being a retractable bracket, said retractable bracket being disposed away from the surface of said vehicle when said cover means is extended and being disposed proximate the surface of said vehicle when said cover means is retracted.

11. A cover as in claim 10 wherein said retractable bracket comprises:

spring means rigidly fixed to said vehicle at an upper end of said spring means; and bracket means attached to said spring means at another end so that said bracket means is biased toward the surface of said vehicle by said spring means.

12. Apparatus as in claim 9 wherein each of said drawing means and said driving means is an electric motor.

13. A cover as in claim 1, 2, 3, 4 or 8 wherein said flap extending means comprises:

a hollow roller rotatably attachable to said vehicle, said cover means being attached to said roller, said roller having a closed end and an open end;

means, attached to said cover, for containing a fluid, said containing means being disposed into said flaps so as to extend said flaps outwardly from said cover when said containing means is filled with said fluid, said containing means being attached to said roller so that said fluid can communicate with the hollow portion of said roller;

means, mountable on said vehicle, for compressing said fluid; and means for connecting said compressing means and said roller open end, said connecting means including a rotatable coupling having a first portion fixed with respect to said roller and a second portion fixed with respect to said compressing means.

14. A cover as in claim 2, 4, or 8 further comprising means for scraping said cover as it is retracted, said scraping means including arms extending between said cover means and said flaps when said flaps are retracted.

15. A cover as in claim 14 wherein:

said cover further comprises a compartment for storing said cover means when it is retracted, said compartment having a slit through which said cover means extends; and said scraping means is attached to said container on a side of said slit toward which a top surface of said cover means is facing, said scraping means extending over said slit so as to engage said covering means.

16. An expandable cover for a vehicle, said vehicle having a passenger compartment, said cover comprising:

cover means attachable to said vehicle;

means for extending and retracting said cover means, said cover means for covering the length of said passenger compartment when said cover means is fully extended;

said cover means including flaps on opposite sides of said cover means and extending along said passenger compartment when said cover means is extended;

means, attached to said cover means, for containing a fluid, said containing means being disposed into said flaps so as to extend said flaps outwardly from said cover means when said containing means is filled with said fluid;

means for filling said containing means with said fluid; and means for retracting said flaps when said fluid is released from said containing means.

17. An expandable cover for a vehicle, said vehicle having a passenger compartment, said cover comprising:

a roller rotatably attached to said vehicle on one side of said passenger compartment;

cover means having first and second ends and two sides, said first end being attached to said roller, said two sides including flaps extending at least part of the length of said sides;

a plurality of brackets attached to the upper surface of said vehicle;

first and second means, attached along the length of said cover means, for guiding said cover means over said brackets, each of said guiding means being slidably engageable with selected ones of said brackets;

means for drawing said cover means along said brackets over said passenger compartments;

means, attached to said cover means second end in alignment with said guiding means for connecting said cover means to said drawing means;

means for driving said rollers so as to wrap said cover means about said rollers;

means, attached to said cover means, for containing a fluid, said containing means being disposed into said flaps so as to extend said flaps outwardly from said cover means when said containing means is filled with said fluid;

means for filling said containing means with said fluid; and means for retracting said flaps when said fluid is released from said containing means.

18. An expandable cover for a vehicle, said vehicle having a passenger compartment, said cover comprising:

a roller rotatably attached to said vehicle on one side of said passenger compartment;

cover means having first and second ends and two sides, said first end being attached to said roller, said two sides including flaps extending at least part of the length of said sides;

a plurality of brackets attached to the upper surface of said vehicles, each of said brackets including a housing and two wheels rotatably attached to said housing on axes normal to the surface of said vehicle;

first and second means for guiding said cover means over said brackets, each of said guiding means including a first portion attached to said cover means and extending between said rollers and a second portion attached to said first portion for maintaining said first portion in engagement with said wheels, said brackets being aligned with said guiding means;

means for drawing said cover means along said brackets over said passenger compartment;

means, attached to said cover means second end in alignment with said guiding means for connecting said cover means to said drawing means;

means for driving said roller so as to wrap said cover means about said roller;

means, attached to said cover means, for containing a fluid, said containing means being disposed into said flaps so as to extend said flaps outwardly from said cover means when said containing means is filled with said fluid;

means for retracting said flaps when said fluid is released from said containing means; and means for scraping said cover before it is rolled on said roller.

19. A cover as in claim 6, 16, 17 or 18 wherein:
said cover means includes portions having a double thickness;
said containing means includes areas of said cover means double thickness portions wherein said double thickness is not attached together; and
said filling means includes an air compressor.

20. A cover as in claim 6, 17 or 18 wherein:
said containing means includes tubes attached to said cover means; and
said filling means includes an air compressor.

21. A cover as in claim 18 further comprising containing means for storing said cover means in a retracted position, said containing means including a slit through which said cover means extends, said scraper being attached to said containing means on a side of said slit toward which an upper surface of said cover means faces, said scraper extending over said slit to engage said cover means upper surface.

22. A cover as in claim 7 or 18 wherein said retracting means includes torsion springs attached to said cover means for folding said flaps over a remainder of said cover means when said flaps are not extended.

23. A cover as in claim 17 or 18 wherein at least one of said brackets is a retractable bracket disposed away from said vehicle surface when said cover means is extended and disposed proximate said vehicle surface when said cover means is retracted.

24. A cover as in claim 23 wherein said retractable bracket includes spring means having an upper end fixed with respect to said vehicle surface and a lower end attached to said bracket, said spring means biasing said retractable bracket toward said vehicle surface.

25. A cover as in claim 17 or 18 wherein:
said roller is hollow, having an open end and a closed end, said containing means communicating with the interior of said roller; and
said filling means comprises a compressor and a rotatable coupling having a first end attached to said roller open end and a second end attached and fixed with respect to said compressor.

26. A cover as in claim 17 or 18 wherein each of said driving means and drawing means includes an electric motor.

27. A cover as in claim 14 wherein said arms extend in a "V" from a common connection in a direction having a component parallel to the motion of said cover means during extension.

* * * * *